W. J. BAYRER.
POWER TRANSFERRING MECHANISM.
APPLICATION FILED MAY 10, 1915.
1,169,115.
Patented Jan. 25, 1916.
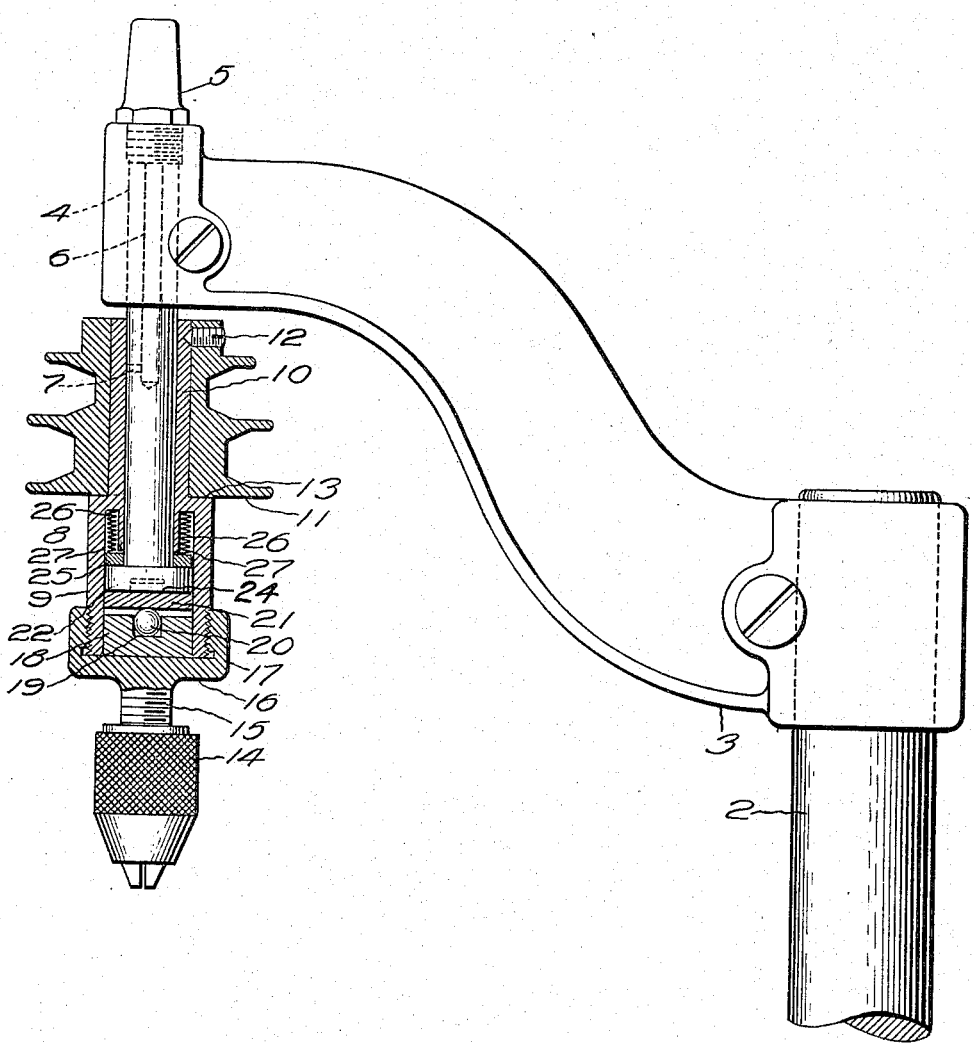

UNITED STATES PATENT OFFICE.

WILLIAM J. BAYRER, OF HARTFORD, CONNECTICUT, ASSIGNOR TO THE HENRY & WRIGHT MANUFACTURING COMPANY, OF HARTFORD, CONNECTICUT, A CORPORATION OF CONNECTICUT.

POWER-TRANSFERRING MECHANISM.

1,169,115.  Specification of Letters Patent.  Patented Jan. 25, 1916.

Application filed May 10, 1915. Serial No. 26,998.

*To all whom it may concern:*

Be it known that I, WILLIAM J. BAYRER, a citizen of the United States, residing at Hartford, in the county of Hartford and State of Connecticut, have invented certain new and useful Improvements in Power-Transferring Mechanism, of which the following is a specification.

This invention relates to power-transferring mechanism, the object of the invention being to provide means of this character which is simple in construction, by which high speeds can be obtained, friction reduced to a minimum, which is compact, and the parts of which can be assembled for proper action without undue preciseness in the construction of one or more of them. Power-transferring mechanism involving my invention, can be employed with advantage in a variety of different connections, that is either a tool or work can be operated thereby.

In the drawing accompanying and forming part of the present specification I have shown in part section and part elevation, the upright and overhanging arm or bracket of a drilling machine equipped with power transferring mechanism constructed in accordance with the invention, said mechanism being utilized to rotate a chuck to which a drill or other suitable tool may be connected.

In said drawing the numeral 2 denotes a column or upright, to the upper end of which is clamped one extremity of an overhanging arm or bracket as 3, the power transferring means being sustained by said arm at its other extremity. Clamped at the forward end of said bracket is the stud 4 which as will be understood is not rotary. Threaded into the upperside of the free end of the bracket is an oil cup 5 which delivers its oil into the bore 6 extending longitudinally of the stud 4. The upper end of the stud as will be understood extends short of the top of the arm 3, the upper end of the bore opening into the upper surface of the stud. The bore or duct extends part of the length of the stud and leading from it near its closed inner end is the lateral port 7 to supply lubricant to a sleeve as 8. Said sleeve 8 is externally of two diameters, the portion 9 of greater diameter being in the form practically of an inverted cylindrical cup. The reduced or shank portion 10 of the sleeve 8 receives around it a suitable driving member such as the pulley 11, the two being suitably connected for rotation, for instance by pinning, the screw 12 being shown for this purpose. Said screw is tapped into the stepped or cone pulley 11 and its pointed end enters a correspondingly shaped socket in the reduced portion 10. By forming the sleeve of two external diameters, I produce at the junction of the two portions 9 and 10 thereof, an external annular shoulder 13 which presents a suitable bearing for the pulley 11. As shown the upper ends of the sleeve or hollow spindle member 8 and the pulley are flush and out of contact with the adjacent end of the overhanging arm or bracket 3.

The chuck 14 may be removably connected with the threaded stud 15 of the cap 16, the bottom of which preferably fits solidly against the outer edge of the cup-like portion 9. The flange 17 of said cap 16 is in threaded engagement with the outer end of the cup-like part 9. The bottom of said cap 16 presents a suitable support for the disk 18 presenting one member of an anti-friction bearing, said anti-friction bearing member 18 being hardened and having on its inner side the pocket 19 to receive an anti-friction element such as the ball 20. The other element of the bearing consists of a hardened disk 21 which freely fits the cup-like part 9 and which engages the ball 20. The disk or bearing member 18 closely fits the cup 9.

The stud 4 has at its lower end the circular foot 22 which also freely fits the cup 9, and this foot is connected with the hardened bearing member in some suitable manner, for instance, by a tongue or key portion 24 on the bearing member 21 which enters a notch or groove in the adjacent surface of the foot 22 which provides a simple means for preventing the bearing member 21 from turning. Surrounding the body part of the stud 4 is a washer 25 which engages the foot 22, this washer presenting a convenient means for receiving the thrusts of protractile or push springs 26 situated in sockets 27 extending upwardly from the upper surface of the chamber of the cup portion 9; said springs 26 are under constant tension. This construction is advantageous in that by it wear is automatically taken up or compensated for. Beside this no great accuracy is required in forming the chamber of the cup 9 except that this chamber should be of a depth slightly greater than the combined depth of the parts within it. It will be clear that the thrust of the springs 26 in the construction shown, is upward, these springs finding a bearing against a stationary part of the stud 4, so that their constant effect is to elevate the sleeve 8, not only to take up the wear but to accurately position the bearing parts in the cup 9, notwithstanding the difference in depth between said chamber and the parts therein to which I have alluded.

It will be noted that the stationary stud 4 is of two diameters, the shank of the stud as represented being of less diameter than the foot 22 thereof. It will also be observed that internally the sleeve or shell is of two diameters. As constructed both the stud and the shell are in one piece, although this is not always necessary. The shank or portion of less diameter of the stud fits the less internally diametrical portion of the sleeve or shell, while the larger diametrical portion or foot of the stud is situated in the larger internally diametrical portion of the sleeve or shell which provides a simple and effective means for limiting longitudinal movement of the sleeve or shell with respect to the stud. In the organization represented the stud constitutes the sole support for the shell and the latter in turn being closed at its lower end presents a highly advantageous reservoir for the oil, thus insuring adequate lubrication of the parts in the sleeve or shell.

What I claim is:

1. Power transferring mechanism comprising a stationary stud, a sleeve rotary around the stud, a cap closing one end of the sleeve, an anti-friction bearing between the cap and the stud, and yieldable means in the sleeve for forcing the sections of the bearing toward each other.

2. Power transferring mechanism comprising a stud, a sleeve rotative about the stud, a cap closing the stud, an anti-friction bearing between the cap and the stud, and springs, the chamber of the sleeve having sockets to receive the springs, the springs acting against the stud to yieldingly force the sections of the anti-friction bearing toward each other.

3. Power transferring mechanism comprising a fixed stud and a rotary sleeve supported by the stud, one end of the sleeve being closed, whereby said sleeve constitutes an oil reservoir and the stud constituting the sole support for the sleeve.

4. Power transferring mechanism comprising a fixed stud and a rotary sleeve surrounding said stud and one end closed, whereby said sleeve constitutes an oil reservoir, the stud having an oil receiving duct in communication with the space between the stud and the sleeve to thus supply oil to said space.

In testimony whereof I affix my signature in presence of two witnesses.

WILLIAM J. BAYRER.

Witnesses:
L. L. MARKEL,
HEATH SUTHERLAND.

Copies of this patent may be obtained for five cents each, by addressing the "Commissioner of Patents, Washington, D. C."